(12) United States Patent
Wu (10) Patent No.: US 9,892,632 B1
(45) Date of Patent: Feb. 13, 2018

(54) CONFIGURING UNIVERSAL REMOTE CONTROL DEVICE FOR APPLIANCES BASED ON CORRELATION OF RECEIVED INFRARED SIGNALS AND DETECTED APPLIANCE EVENTS

(71) Applicant: Google Inc., Mountain View, CA (US)

(72) Inventor: Honglei Wu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/131,463

(22) Filed: Apr. 18, 2016

(51) Int. Cl.
| H04B 10/00 | (2013.01) |
| G08C 23/04 | (2006.01) |
| H04B 10/80 | (2013.01) |
| H04B 10/66 | (2013.01) |
| H04N 5/44 | (2011.01) |

(52) U.S. Cl.
CPC ............ *G08C 23/04* (2013.01); *H04B 10/66* (2013.01); *H04B 10/80* (2013.01); *H04N 5/4403* (2013.01); *G08C 2201/92* (2013.01)

(58) Field of Classification Search
CPC .. G08C 23/04; G08C 2201/92; H04N 5/4403; H04B 10/80; H04B 10/66
See application file for complete search history.

(56) References Cited

U.S. PATENT DOCUMENTS

| 5,614,906 | A * | 3/1997 | Hayes | G08C 19/28 |
| | | | | 340/12.28 |
| 6,914,551 | B2 * | 7/2005 | Vidal | G08C 17/02 |
| | | | | 340/4.37 |
| 7,136,709 | B2 * | 11/2006 | Arling | G05B 15/02 |
| | | | | 340/3.1 |
| 7,224,903 | B2 * | 5/2007 | Colmenarez | G08C 19/28 |
| | | | | 348/734 |
| 9,111,439 | B2 * | 8/2015 | Van Vleck | G08C 17/02 |
| 2003/0074088 | A1 * | 4/2003 | Gonzales | G05B 19/042 |
| | | | | 700/19 |
| 2007/0192910 | A1 * | 8/2007 | Vu | B25J 5/007 |
| | | | | 700/245 |

(Continued)

OTHER PUBLICATIONS

TouchSquid; Introduction to the Touchsquid Application; Oct. 28, 2013; 13 pages.

(Continued)

*Primary Examiner* — Danny Leung
(74) *Attorney, Agent, or Firm* — Brake Hughes Bellermann LLP (57) ABSTRACT

An example technique of configuring a universal remote control device includes receiving a plurality of transmitted infrared signals during a time period; storing the plurality of infrared signals and a time of each of the plurality of infrared signals; detecting a plurality of appliance events during the time period; storing the plurality of appliance events and a time of each of the plurality of appliance events; correlating the plurality of infrared signals with the plurality of appliance events based on the time of each of the plurality of infrared signals and the time of each of the plurality of appliance events; and defining configuration information for a universal remote control device based on the correlating of the plurality of infrared signals with the plurality of appliance events.

22 Claims, 3 Drawing Sheets

(56) References Cited

U.S. PATENT DOCUMENTS

| | | | | |
|---|---|---|---|---|
| 2007/0222901 | A1* | 9/2007 | Tsubota | G08C 23/04 348/734 |
| 2008/0316371 | A1* | 12/2008 | Hauck | H03J 1/0025 348/734 |
| 2011/0266889 | A1* | 11/2011 | Blohm | H02J 13/0065 307/117 |
| 2012/0146918 | A1* | 6/2012 | Kreiner | H04M 1/7253 345/173 |
| 2012/0325197 | A1* | 12/2012 | Legaspi | F23N 5/242 126/42 |
| 2013/0231991 | A1* | 9/2013 | Denari | G06Q 30/0222 705/14.23 |
| 2014/0068486 | A1* | 3/2014 | Sellers | G06F 3/04847 715/771 |
| 2014/0223461 | A1* | 8/2014 | Hatambeiki | H04N 21/44218 725/10 |
| 2014/0223463 | A1* | 8/2014 | Hatambeiki | H04N 21/44204 725/12 |
| 2014/0235265 | A1* | 8/2014 | Slupik | H04W 4/02 455/456.1 |
| 2015/0058740 | A1* | 2/2015 | Asahi | G08C 17/02 715/740 |
| 2015/0194048 | A1* | 7/2015 | Haubrich | G08C 17/02 340/12.5 |
| 2015/0243163 | A1* | 8/2015 | Shoemake | G08C 23/02 367/197 |
| 2015/0253364 | A1* | 9/2015 | Hieda | H04Q 9/00 702/62 |

OTHER PUBLICATIONS

Jeffrey Nichols et al.; Generating Remote Control Interfaces for Complex Appliances; UIST '02 Proceedings of the 15th annual ACM symposium on User Interface software and technology; 2002; 12 pages.

Logitech Harmony Smart Control User Guide; 2013; 43 pages.

\* cited by examiner

CONFIGURING UNIVERSAL REMOTE CONTROL DEVICE FOR APPLIANCES BASED ON CORRELATION OF RECEIVED INFRARED SIGNALS AND DETECTED APPLIANCE EVENTS

TECHNICAL FIELD

This description relates to communications, and in particular, to an intermediary for multiple-transport client-device communications.

BACKGROUND

Many appliances, such as, for example, entertainment appliances, may come with an original remote control device, which may be provided for remotely controlling the appliance via transmission of infrared (IR) signals or codes. Each IR signal or code may cause one or more appliance events to occur or be performed by the appliance, e.g., turn the appliance on or off, turn the volume up or down, change the channel or select a different channel preset, select a different media input for a TV, select TV guide, toggle the mute button, play media, etc.

However, the IR signals used by different appliances are typically different and incompatible. Thus, an original remote control device that is used to control one appliance may typically not be used to control a different appliance.

Universal remote control devices have been developed in attempt to manage multiple remote control devices. However, setting up or configuring a universal remote control device can be a difficult or complex process that many users do not want to perform.

SUMMARY

According to an example implementation, a computer-implemented method is provided for executing instructions stored on a non-transitory computer-readable storage medium. The method may include receiving a plurality of transmitted infrared signals during a time period, storing the plurality of infrared signals and a time of each of the plurality of infrared signals, detecting a plurality of appliance events during the time period, storing the plurality of appliance events and a time of each of the plurality of appliance events, correlating the plurality of infrared signals with the plurality of appliance events based on the time of each of the plurality of infrared signals and the time of each of the plurality of appliance events, and defining configuration information for a universal remote control device based on the correlating of the plurality of infrared signals with the plurality of appliance events.

According to an example implementation, an apparatus may include a processor that is configured to receive a plurality of transmitted infrared signals during a time period, store the plurality of infrared signals and a time of each of the plurality of infrared signals, detect a plurality of appliance events during the time period, store the plurality of appliance events and a time of each of the plurality of appliance events, correlate the plurality of infrared signals with the plurality of appliance events based on the time of each of the plurality of infrared signals and the time of each of the plurality of appliance events, and define configuration information for a universal remote control device based on the correlating of the plurality of infrared signals with the plurality of appliance events.

According to another example implementation, a computer program product is tangibly embodied on a non-transitory computer-readable storage medium and includes instructions that, when executed, are configured to cause at least one processor to: receive a plurality of transmitted infrared signals during a time period, store the plurality of infrared signals and a time of each of the plurality of infrared signals, detect a plurality of appliance events during the time period, store the plurality of appliance events and a time of each of the plurality of appliance events, correlate the plurality of infrared signals with the plurality of appliance events based on the time of each of the plurality of infrared signals and the time of each of the plurality of appliance events, and define configuration information for a universal remote control device based on the correlating of the plurality of infrared signals with the plurality of appliance events.

According to an example implementation, an apparatus may include means for receiving a plurality of transmitted infrared signals during a time period, means for storing the plurality of infrared signals and a time of each of the plurality of infrared signals, means for detecting a plurality of appliance events during the time period, means for storing the plurality of appliance events and a time of each of the plurality of appliance events, means for correlating the plurality of infrared signals with the plurality of appliance events based on the time of each of the plurality of infrared signals and the time of each of the plurality of appliance events, and means for defining configuration information for a universal remote control device based on the correlating of the plurality of infrared signals with the plurality of appliance events.

According to an example implementation, an apparatus includes an infrared receiver configured to receive a plurality of transmitted infrared signals during a time period, an appliance event detector configured to detect a plurality of appliance events during the time period, a storage device configured to: store the plurality of infrared signals and a time of each of the plurality of infrared signals, and store the plurality of appliance events and a time of each of the plurality of appliance events, a correlator configured to correlate the plurality of infrared signals with the plurality of appliance events based on the time of each of the plurality of infrared signals and the time of each of the plurality of appliance events, and a defining logic configured to define configuration information for a universal remote control device based on the correlating of the plurality of infrared signals with the plurality of appliance events.

According to an example implementation, a computer-implemented method is provided for executing instructions stored on a non-transitory computer-readable storage medium. The method may include correlating a plurality of received infrared signals with a plurality of detected appliance events based on a time of each of the plurality of infrared signals and a time of each of the plurality of appliance events, and defining configuration information for a universal remote control device based on the correlating of the plurality of infrared signals with the plurality of appliance events.

According to an example implementation, an apparatus may include a processor that is configured to correlate a plurality of received infrared signals with a plurality of detected appliance events based on a time of each of the plurality of infrared signals and a time of each of the plurality of appliance events, and define configuration information for a universal remote control device based on the correlating of the plurality of infrared signals with the plurality of appliance events.

According to another example implementation, a computer program product is tangibly embodied on a non-transitory computer-readable storage medium and includes instructions that, when executed, are configured to cause at least one processor to: correlate a plurality of received infrared signals with a plurality of detected appliance events based on a time of each of the plurality of infrared signals and a time of each of the plurality of appliance events, and define configuration information for a universal remote control device based on the correlating of the plurality of infrared signals with the plurality of appliance events.

According to an example implementation, an apparatus may include means for correlating a plurality of received infrared signals with a plurality of detected appliance events based on a time of each of the plurality of infrared signals and a time of each of the plurality of appliance events, and means for defining configuration information for a universal remote control device based on the correlating of the plurality of infrared signals with the plurality of appliance events.

According to an example implementation, an apparatus may include a correlator configured to correlate a plurality of received infrared signals with a plurality of detected appliance events based on a time of each of the plurality of infrared signals and a time of each of the plurality of appliance events, and a defining logic configured to define configuration information for a universal remote control device based on the correlating of the plurality of infrared signals with the plurality of appliance events.

The details of one or more implementations are set forth in the accompanying drawings and the description below. Other features will be apparent from the description and drawings, and from the claims.

DETAILED DESCRIPTION

This document describes techniques for configuring a universal remote control device (or application) for appliances based on correlation of received infrared signals with detected appliance events (detected device actions performed in response to received infrared signals). Consumers may typically purchase and use a wide variety of appliances, such as entertainment (or media) appliances. These appliances are developed and sold by a number of different electronics manufacturers. Some example entertainment appliances, by way of example, may include a television (TV), a DVD (digital video disc) player/recorder, an audio/video receiver or a stereo receiver, a digital video recorder for recording TV programs or videos, a set-top box (or video receiver) for cable or satellite television, a video streaming device (e.g., which may connect to a media port, such as HDMI (High-Definition Multimedia Interface) port, of a TV. The media streaming device may, for example, be connectable to the HDMI port of a TV or other device, and may stream selected video programs or other content via the HDMI port to the TV from the Internet or a network. These are just a few example appliances, and new appliances are being developed every year.

In many cases, many of the entertainment appliances may come with an original remote control device (e.g., an original remote control device, that may often be sold/provided with the appliance and is provided specifically for controlling the appliance) to allow a user to remotely control the appliance, typically via the transmission and reception of infrared (IR) signals (or IR codes). Each IR signal or code may cause one or more appliance events to occur or be performed by the appliance, e.g., turn the appliance on or off, turn the volume up or down, change the channel or select a different channel preset, select a different media input for a TV, select TV guide, toggle the mute button, play media (e.g., play a video on a DVD player or digital video recorder), pause media that is being played, stop media being played, etc. These are some example appliance events, e.g., which, at least in some cases, may be performed by the appliance(s) based on IR signals received from a remote control device.

However, the IR signals used by each appliance are typically different and incompatible. Thus, an original remote control device that is used to control one appliance may typically not be used to control a different appliance. For example, a user may typically control the TV with a first original remote control device, control a DVD player with a second original remote control device, control an audio/video receiver with a third remote original control device, control a set-top box/satellite receiver with a fourth original remote control device, etc. Universal remote control devices have been developed in attempt to manage multiple remote control devices. However, setting up or configuring a universal remote control device can be a difficult or complex process that many users do not want to perform.

Therefore, according to an example implementation, techniques are provided to configure a universal remote control device for appliances based on a correlation of received infrared signals and detected appliance events.

According to an example implementation, a technique may include receiving (e.g., by an infrared receiver) a plurality of transmitted infrared (IR) signals (e.g., from one or more original remote control devices) during a time period, storing the plurality of infrared signals and a time of each of the plurality of infrared signals, detecting (e.g., by one or more event detectors) a plurality of appliance events during the time period, storing the plurality of appliance events and a time of each of the plurality of appliance events, correlating the plurality of infrared signals with the plurality of appliance events based on the time of each of the plurality of infrared signals and the time of each of the plurality of appliance events, and defining configuration information for a universal remote control device based on the correlating of the plurality of infrared signals with the plurality of appliance events. For example, the configuration information may include a mapping between one or more of the plurality of IR signals and one or more of the appliance events.

The configuration information may be provided or downloaded to a universal remote control device, or to a smartphone or other computing device that includes a universal remote control application. The universal remote control device/application may then be used to remotely control one or more appliances, based on the configuration information. Therefore, according to an example implementation, rather than manually configuring a universal remote control device, a self-learning universal remote control system may be provided that may receive or detect appliance events and received IR signals, correlate the times for the appliance events with the times of the IR signals (e.g., to determine a relationship(s) between one or more IR signals and one or more appliance events), and define configuration information for a universal remote control device based on the correlation.

Figure 1:
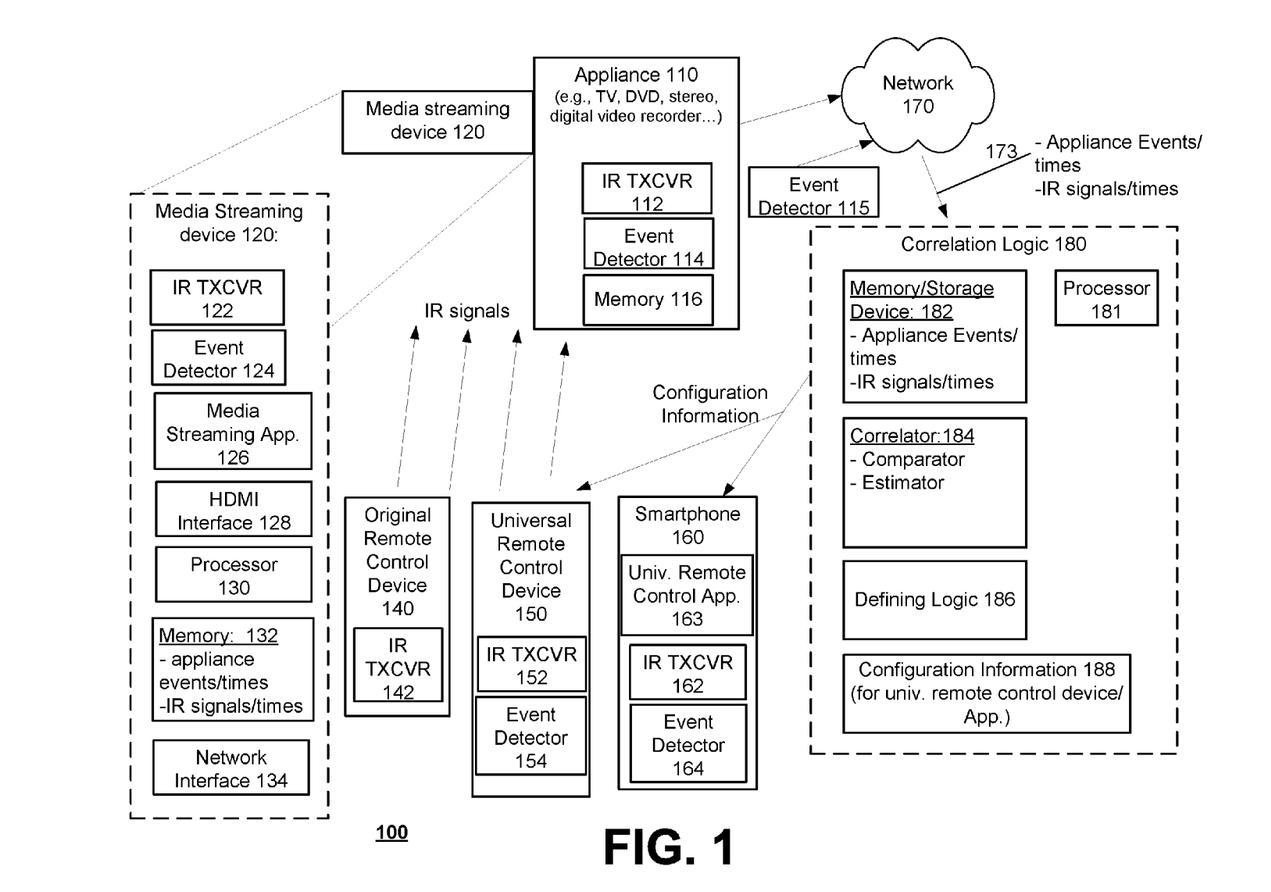
FIG. 1 is a block diagram of a system according to an example implementation.

FIG. 1 is a block diagram of a system 100 according to an example implementation. System 100 includes one or more appliances 110, which may be remotely controlled by an infrared (IR) remote control device, such as, for example, by an original remote control device 140, a universal remote control device 150 and/or a smartphone 160 that may include a universal remote control application 163. In an example implementation, original remote control device 140 may be sold/provided with the appliance 110 (or otherwise correspond to or designed for operation with the appliance 110) and may be provided specifically for controlling the appliance 110 (e.g., transmits IR signals that are used to control appliance 110).

According to an example implementation, appliance 110 may be any type of appliance, such as, for example, an entertainment (or media) appliance. An entertainment appliance (or media appliance) may include an appliance that is involved in the communication or presentation of media (e.g., audio or video or other media) or entertainment. An entertainment appliance may include, for example, a TV (television), a DVD (digital video disc) player/recorder, a stereo component or stereo/audio receiver, a digital video recorder, a set-top box for cable or satellite TV, or other media/entertainment appliance. In another example implementation, the appliance 110 may include other types of appliances, such as a kitchen appliance (e.g., oven, microwave, dishwasher, washing machine, dryer, . . . ) or other electronic appliance that may be controlled electrically/electronically (e.g., a light controller, thermostat for controlling a heating/air conditioning system, alarm system, . . . ). In an example implementation, the appliance may be illustrated or described as a TV, but other appliances may be used. While only one appliance 110 is shown in system 100 of FIG. 1, system 100 may include a plurality of different types of appliances, each of which may include its own original remote control device provided to remotely control the appliance via transmission of IR signals.

According to an example implementation, appliance 110 may include an infrared transceiver (transmitter/receiver) 112 to transmit and/or receive infrared signals. In an example implementation, the infrared signals may be or may communicate infrared commands or infrared codes to control appliance 110. According to an example implementation, different infrared signals (or IR codes) may cause an appliance to perform various appliance events, such as, for example: turning an appliance on or off; increasing a volume of an appliance (e.g., increasing a volume of a TV or audio/stereo appliance); decreasing a volume of an appliance; increasing a channel of an appliance (e.g., increasing a channel of a TV or set-top box or satellite/cable receiver); decreasing a channel of an appliance; playing media on an appliance (e.g., playing a video on a DVD player, from digital video recorder, or from a computer/computing device that stores digital videos/movies, etc.); pausing media that is playing on an appliance; and stopping media that is being played on an appliance. These are merely some example appliance events that may be caused to happen in response to an infrared (IR) signal, and other appliance events may be provided or performed in response to various IR signals.

Appliance 110 may also include an event detector 114 to detect one or more appliance events. For example, if appliance 110 is a TV, then event detector 114 may detect various appliance events related to the TV, such as, for example, turning on or off the TV, turning volume up or down on the TV, increasing or decreasing a channel or changing the channel to a specific channel on the TV, etc. In the event that appliance 110 is a different type of appliance, event detector 114 may detect other types of appliance events, e.g., a light/optical sensor to detect when a light has been turned on or off, a microphone to receive audio signals to determine if volume of an appliance has been increased or decreased, a heat sensor to determine when a stove or oven has been turned on, etc.

According to an example implementation, appliance 110 may also include a memory 116, which may store, for example, one or more appliance events and a time for each appliance event, and one or more IR signals (or IR codes) that were received by IR transceiver 112 and a time for each IR signal. The times for the one or more appliance events may, for example, include a time (or timestamp) indicating a time that the appliance event was detected, a time the appliance event was processed by a processor, or a time the appliance event was stored in memory 116, as examples, or other time. While any time reference point (e.g., time of receipt of appliance event, time of storage of the appliance event in memory . . . ) may be used, a consistent time reference point may be used for a plurality of detected appliance events. Similarly, the times for the one or more infrared signals (or IR codes) that are received by IR transceiver 112 and stored in memory 116 may be a time of receipt/detection by the IR transceiver 112, a time of storage of the IR signal (or IR code) in memory 116, etc. For example, a consistent time reference point may be used for received/detected IR signals. Although not shown appliance 110 may also include a processor and a network interface for communicating via network 170 to other network devices, for example.

According to an example implementation, a media streaming device 120 may be connected to appliance 110. For example, media streaming device may be connected (e.g., removably connected) to the HDMI port of a TV or other device, and may stream selected video programs or other content via the HDMI port to the TV (e.g., appliance 110) from the Internet or a network. As shown in FIG. 1, an example media streaming device may include one or more (or even all) of the following: an IR transceiver 122 to transmit and/or receive IR signals (e.g., to receive IR signals transmitted by a remote control device, which may be stored in memory 132 with a time for the IR signal); an event detector 124 to detect appliance events (where the detected appliance events and a time for each appliance event may be stored in memory 132); a media streaming application 126 to stream, or configure the streaming, of a video or other media to the appliance 110 via a media port (e.g., via a HDMI port); a HDMI interface 128 to interface or connect to appliance 110 via the HDMI port of the appliance 110; a processor 130; a memory 132, which may store appliance events and times for each of the appliance events and IR signals and times for the IR signals; and a network interface for sending and/or receiving signals or media from a server via network 170, for example.

According to an example implementation, an original remote control device may be provided for each of one or more appliances. For example, an original remote control device 140 may be provided to control appliance 110. Original remote control device 140 may include an IR transceiver 142 to transmit and/or receive IR signals (or IR codes). For example, a first IR signal may be transmitted from original remote control device 140 to cause appliance 110 (e.g., a TV) to turn the volume up, a second IR signal may be transmitted to turn the volume down on appliance 110, a third IR signal may be transmitted to increase (or change) the channel on the appliance 110, etc.

In addition, according to an example implementation, system 100 may include a universal remote control device 150 and/or a smartphone 160. Universal remote control device 150 may include an IR transceiver 152 to transmit and/or receive IR signals, and an event detector 154 to detect one or more appliance events. Similarly, smartphone 160 may include an IR transceiver 162 to transmit and/or receive IR signals, and an event detector 164 to detect one or more appliance events. Smartphone 160 may also include a universal remote control application 163 to control each of one or more appliances via the transmission of IR signals to each appliance. In an example implementation, universal remote control device 150 and/or universal remote control application 163 of smartphone 160 may receive and store in memory (not shown) configuration information 188 to allow the universal remote control device 150 and/or the smartphone 160 to control a plurality of different appliances.

According to an example implementation, IR signals may be transmitted, for example, from one or more original remote control devices 140 to control one or more appliances. Various IR transceivers (or IR receivers) may be used to detect or receive the IR signals. For example, at least one of the following IR transceivers (each including an IR receiver) may be used to receive or detect an IR signal: IR transceiver 112 (e.g., built into or included as part of appliance 110) of appliance 110, IR transceiver 122 of media streaming device 120 (which may be within range to receive IR signals transmitted to control appliance 110 and/or other appliances), IR transceiver 152 of universal remote control device 150, and/or IR transceiver 162 of smartphone 160, as some examples. For example, universal remote control device 150 and/or smartphone 160, at least in some cases, may be placed near appliance 110 so as to receive or detect any IR signals transmitted by original remote control device 140 to appliance 110. While system 100 includes various IR transceivers, one or more of these transceivers, depending on the example implementation, may be replaced with only an IR receiver or only an IR transmitter, depending on whether the device will be receiving or transmitting IR signals, or both.

As noted, while only one appliance 110 is shown in system 100, the system 100 may include many (or a plurality of) different appliances. Various (or one or more) event detectors may be used to detect various appliance events. For example, one or more event detectors may detect appliance events, such as when an appliance is turned on or off, when volume is turned up or down, when the channel is increased or decreased, when media is played, paused or stopped, when media is fast forwarded, when the appliance is muted, etc. For example, one or more of the following may be used to detect one or more appliance events: event detector 114 of appliance 110; event detector 115, which may be a separate event detector provided near one or more appliances to detect appliance events of various appliances; event detector 124 of media streaming device 120 may detect or determine appliance events for one or more appliances (e.g., event detector 124 may be notified by appliance 110, e.g., via HDMI port on appliance 110, when appliance 110 turns on or off, when the channel on appliance 110 is increased or decreased, when media/video on appliance 110 is played, paused or stopped, etc., or event detector may detect when an event occurs on another nearby appliance, for example); event detector 154 of universal remote control device 150; and/or event detector 164 of smartphone 160 (e.g., where universal remote control device 150 and/or smartphone 160 may be placed near one or more appliances to detect appliance events for such appliance events and times for the appliance events, which may be stored in memory).

According to an example implementation, appliance events and times for the appliance events, and IR signals (or IR codes) and times for the IR signals may be provided, via line 173, (e.g., by or from one or more of appliance 110 or other appliances, event detector 116, media streaming device 120, universal remote control device 150 and/or smartphone 160, or other device) to a correlation logic 180. In an example implementation, the times for IR signals and/or appliance events may be provided to correlation logic 180 by appliance 110, media streaming device 120, remote control devices 150 or 160, etc. In another example implementation, the times (e.g., timestamps) for the IR signals and/or for the appliance events may be determined by the correlation logic 180. In such an example implementation where correlation logic 180 determines the times for the IR signals and/or appliance events, the time for the IR signals and/or appliance events may be determined as a time of receipt by correlation logic 180 of the IR signal or appliance event, or a time of storage in memory 182 of such IR signals or appliance events, or other time(s) determined by correlation logic 180, where for example, such appliance events and/or IR signals may be reported in real-time to correlation logic 180).

Correlation logic 180 may correlate the one or more appliance events with the one or more IR signals, e.g., based on the times for the appliance events and the times for the IR signals, to determine or estimate a relationship(s) between the IR signals and the appliance events. Correlation logic 180 may determine, based on the correlating, configuration information 188, e.g., to be used to configure a universal remote control device 150 and/or a universal remote control application 163 of smartphone 160, or other computing device.

Correlation logic 180 may include a processor 181 and a memory (or storage device) 182, e.g., for storing appliance events and times for the appliance events and IR signals (or IR codes) and times for the IR signals. Correlation logic 180 also may include a correlator 184 to correlate IR signals (or times of the IR signals) with the appliance events (or times of the appliance events). Correlator 184 may correlate the plurality of IR signals with the plurality of appliance events based on the time of each of the plurality of IR signals and the time of each of the plurality of appliance events.

In an example implementation, the correlator 184 may include, for example, a comparator to compare the time of each of the plurality of IR signals to the time of each of the plurality of appliance events, and an estimator configured to estimate a causal relationship between one or more of the plurality of IR signals and one or more of the plurality of appliance events based on the comparing.

Correlation logic 180 may also include a defining logic 186 configured to define configuration information 188 for a universal remote control device based on the correlating of the plurality of IR signals with the plurality of appliance events. In an example implementation, the configuration information 188 may include a mapping between one or more of the plurality of IR signals and one or more of the plurality of appliance events.

As an illustrative example, over a period of time (e.g., over a week or two weeks), various IR signals and times and appliance events and times may be received/detected and stored in memory 182. Correlation logic 180 may then correlate these IR signals and appliance events, based on their times, to determine if there is a relationship(s) between one or more IR signals and one or more appliance events, e.g., to determine or estimate that one or more IR signals are causing one or more of the appliance events. For example, if over a 2 week period, 35 instances (which may be more than a minimum of 20 instances of an IR signal to establish or determine that a relationship exists) of a first IR signal are detected. The IR signal and the time of each occurrence of the first IR signal are stored in memory 182. And, according to an illustrative example, for at least a threshold number or threshold percentage (e.g., 90%) of those first IR signal occurrences, a first appliance event (e.g., turning on the appliance 110) is detected within 0.3 seconds (e.g., an occurrence of each first appliance event was detected within a threshold time of a time of the first IR signal, for at least 90% of first IR signal occurrences within a time period of 2 weeks). Therefore, in this illustrative example, based on a minimum number of occurrences of the first IR signal (e.g., more than 20, in this case 35), and based on occurrences of the first appliance event occurring in at least a threshold number (e.g., at least 90% or 30 of the 35 occurrences of the first IR signal) within 0.3 seconds (or a threshold time) of the first IR signal occurrences, the correlator 184 may determine or estimate a relationship between the first IR signal and the first appliance event (e.g., that the first IR signal is causing the first appliance event to occur).

Therefore, in this example, the defining logic 186 may define configuration information 188 including a mapping between the first IR signal and the first appliance event. According to an example implementation, the mapping between the first IR signal and the first appliance event may indicate that, for example, the first IR signal will be transmitted/sent (e.g., from devices 150 or 160) to cause the first appliance event to be performed (e.g., based on specific button(s) pressed on the universal remote control device associated with the appliance event). Thus, the mapping, within the configuration information 188, may operate to map or associate the first IR signal to a specific button on the universal remote control device for performing the first appliance event (e.g., operate to map the first IR signal to the on/off button or power button on the universal remote control device 150 or smartphone 160). This is merely an example, and a variety of different conditions, thresholds, etc., may be used to determine a relationship between an IR signal and an appliance event. This process may be repeated for each of a plurality of IR signals and/or appliance events to determine the configuration information 188 (including a mapping for one or more IR signals and/or appliance events).

Correlation logic 180 may be provided in any location or on any device. For example, correlation logic 180 may be included within or as part of one or more of the following: an appliance (e.g., appliance 110), media streaming device 120, universal remote control device 150, smartphone 160, or other computing device, or located in another location. In an example implementation, correlation logic 180 may be provided in or on a server (e.g., web-based server), or provided as part of a cloud (or network)-based service where appliance events and times for the appliance events, and IR signals and times for the IR signals are provided (or uploaded) for a user account to the cloud-based service, and then the correlation logic 180, provided on the cloud-based service, then provides (and may periodically update) configuration information 188. In this manner, the various devices may observe and record the appliance events and times and the IR signals and times, and then the correlation logic 180 may correlate the appliance events with the IR signals, e.g., to determine a relationship (e.g., a causal relationship) between the IR signals and the appliance events for a variety of appliances. The correlation logic 180 may then determine the configuration information 188, which may be provided to or downloaded by universal remote control device 150 and/or smartphone 160 (e.g., from the network or cloud-based service) to allow these devices 150/160 to remotely control a plurality of different appliances, e.g., without requiring the user to perform the typical manual configuration that is frequently required for a universal remote control device.

Rather than relying on or requiring a manual configuration of a universal remote control device, according to an example implementation, the techniques performed by system 100 may allow or provide a self-learning approach to configuring a universal remote control device/application. According to an example implementation, a user may place one or more event detectors and IR receivers (or IR transceivers) at locations near one or more appliances. This may include, for example, connecting media streaming device 120 to an appliance 110, placing a universal remote control device 150 and/or smartphone 160 near one or more appliances (so as to allow devices 150 and 160 to receive IR signals and detect one or more appliance events), providing event detector 115 near one or more appliances, etc.

According to an example implementation, as part of the self-learning approach for configuring a universal remote control device, a user may then continue normal operation of his/her appliances, e.g., by using the one or more original remote control device(s) 140 to control the one or more appliances. As the user presses keys on the original remote control device(s), IR signals are transmitted from the original remote control device(s) 140 which are received by the associated appliance(s) in order to control the appliance. However, such IR signals are also received by the IR receivers/IR transceivers (e.g., 112, 122, 152, and/or 162), where the IR signal and a time for each received IR signal may be recorded in memory. Similarly, when the user presses a key on a universal remote control device(s) 140, this will cause an appliance event to be performed by the associated appliance, e.g., turn TV on or off, increase or decrease volume, play video, pause video, stop video, etc. One or more event detectors (e.g., 114, 124, 154, 164, 115) may detect and store in memory the appliance events that occurred or were performed and the times of such appliance events.

As part of the self-learning approach to configuring a universal remote control device, the IR signals and times for the IR signals, and the appliance events and the times for the appliance events are provided to the correlation logic 180. As noted, correlation logic 180 may perform a correlation (e.g., based on the times of the IR signals and the times of the appliance events) of the IR signals and the appliance events to determine or estimate a relationship (e.g., a causal relationship between a IR signal and one or more appliance events). The correlation logic 180 may determine configuration information 188 based on the correlation. The configuration information 188 is then provided to a universal remote control device 150 and/or to a universal remote control application 163 of smartphone 160 in order to configure such universal remote control device 150 and/or smartphone 160 for controlling various (or a plurality of)

different appliances, e.g., without requiring the user to perform the typical manual configuration of the universal remote control device. The universal remote control device 150 and/or the smartphone 160 (including the universal remote control application 163) may then be used to control one or more appliances, e.g., instead of using multiple original remote control devices.

Various IR transceivers are shown or illustrated within system 100 of FIG. 1. An IR transceiver (e.g., IR transceivers 112, 122, 142, 152, 162) may include one or both of an IR transmitter and an IR receiver. Thus, where the device is performing only IR transmitting, the IR transceiver may be replaced with an IR transmitter. Where a device is performing only IR receiving, the IR transceiver may be replaced with an IR receiver. Thus, depending on what functionality is required or used, an IR transceiver may provide (or may be replaced with) only an IR transmitter, an IR receiver, or both.

Figure 2:
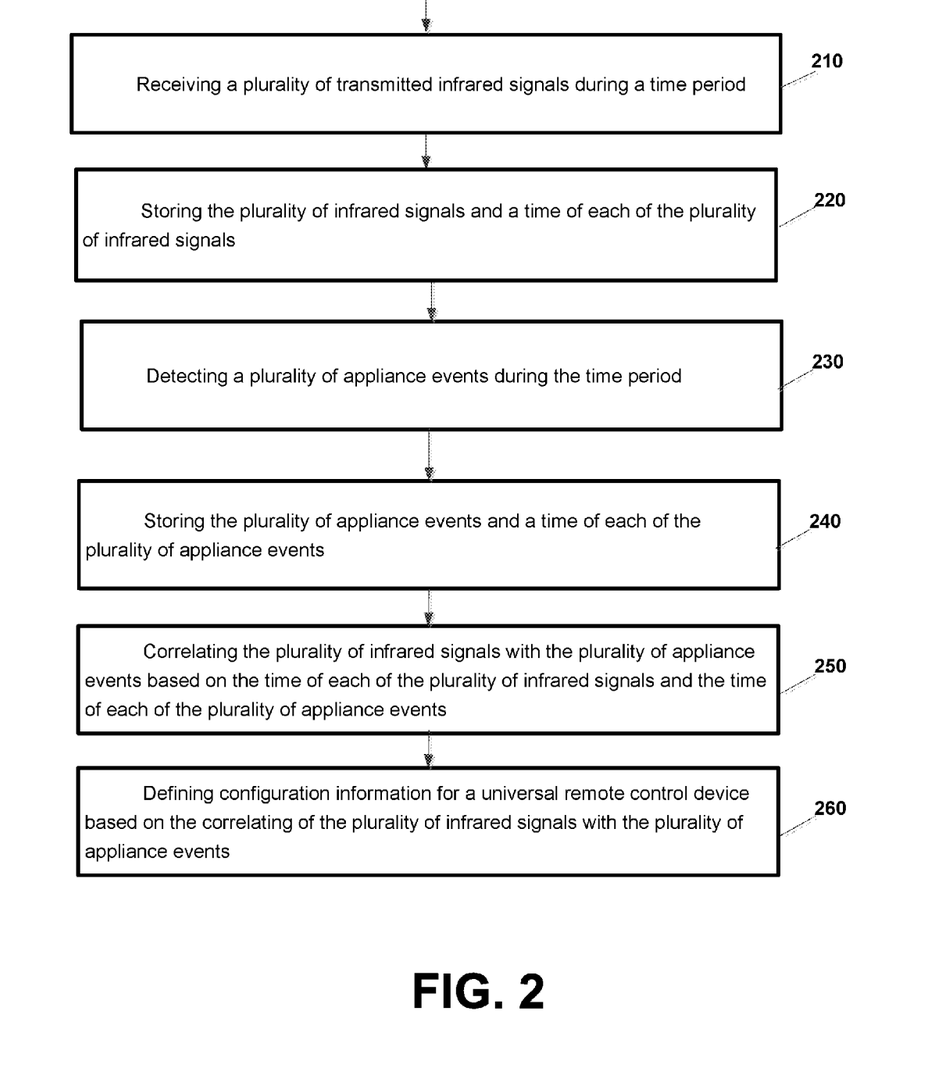
FIG. 2 is a flow chart illustrating operation of a system according to an example implementation.

FIG. 2 is a flow chart illustrating operation of a system according to an example implementation. The flow chart of FIG. 2 may be directed to configuring a universal remote control device. Operation 210 includes receiving a plurality of transmitted infrared signals during a time period. Operation 220 includes storing the plurality of infrared signals and a time of each of the plurality of infrared signals. Operation 230 includes detecting a plurality of appliance events during the time period. Operation 240 includes storing the plurality of appliance events and a time of each of the plurality of appliance events. Operation 250 includes correlating the plurality of infrared signals with the plurality of appliance events based on the time of each of the plurality of infrared signals and the time of each of the plurality of appliance events. And, operation 260 includes defining configuration information for a universal remote control device based on the correlating of the plurality of infrared signals with the plurality of appliance events.

According to an example implementation of the method of FIG. 2, the correlating may include comparing the time of each of the plurality of infrared signals to the time of each of the plurality of appliance events; and estimating a causal relationship between one or more of the plurality of infrared signals and one or more of the plurality of appliance events based on the comparing.

According to an example implementation of the method of FIG. 2, the configuration information may include a mapping between one or more of the plurality of infrared signals and one or more of the plurality of appliance events.

According to an example implementation of the method of FIG. 2, the storing the plurality of infrared signals may include: storing, in a user account provided in a network or a cloud resource, the plurality of infrared signals and the time of each of the plurality of infrared signals; and wherein the storing the plurality of detected appliance events may include: storing, in the user account provided in the network or the cloud resource, the plurality of appliance events and the time of each of the plurality of appliance events.

According to an example implementation of the method of FIG. 2, the plurality of appliance events may include at least one of the following: turning an appliance on or off; increasing a volume of an appliance; decreasing a volume of an appliance; increasing a channel of an appliance; decreasing a channel of an appliance; playing media on an appliance; pausing media that is playing on an appliance; and stopping media that is being played on an appliance.

According to an example implementation of the method of FIG. 2, the receiving a plurality of transmitted infrared signals may include receiving a plurality of transmitted infrared signals that were transmitted by one or more original remote control devices to control one or more appliances.

According to an example implementation of the method of FIG. 2, the method may further include communicating the configuration information to a universal remote control device or a universal remote control application.

According to an example implementation an apparatus may include an infrared receiver configured to receive a plurality of transmitted infrared signals during a time period; an appliance event detector configured to detect a plurality of appliance events during the time period; a storage device configured to: store the plurality of infrared signals and a time of each of the plurality of infrared signals; and store the plurality of appliance events and a time of each of the plurality of appliance events; a correlator configured to correlate the plurality of infrared signals with the plurality of appliance events based on the time of each of the plurality of infrared signals and the time of each of the plurality of appliance events; and a defining logic configured to define configuration information for a universal remote control device based on the correlating of the plurality of infrared signals with the plurality of appliance events.

According to an example implementation of the apparatus, the correlator may include a comparator configured to compare the time of each of the plurality of infrared signals to the time of each of the plurality of appliance events; and an estimator configured to estimate a causal relationship between one or more of the plurality of infrared signals and one or more of the plurality of appliance events based on the comparing.

According to an example implementation of the apparatus, the configuration information may include a mapping between one or more of the plurality of infrared signals and one or more of the plurality of appliance events.

According to an example implementation of the apparatus, the plurality of appliance events comprise at least one of the following: the plurality of appliance events may include at least one of the following: turning an appliance on or off; increasing a volume of an appliance; decreasing a volume of an appliance; increasing a channel of an appliance; decreasing a channel of an appliance; playing media on an appliance; pausing media that is playing on an appliance; and stopping media that is being played on an appliance.

According to an example implementation of the apparatus, the infrared receiver configured to receive a plurality of transmitted infrared signals may include an infrared receiver configured to receive a plurality of transmitted infrared signals that were transmitted by one or more original remote control devices to control one or more appliances.

According to an example implementation of the apparatus, the apparatus may further include a communication interface (e.g., such as a network interface) configured to communicate the configuration information to a universal remote control device or a universal remote control application.

According to an example implementation of the apparatus, wherein the apparatus includes at least one of: an entertainment appliance; an entertainment appliance that includes the apparatus; a media streaming device that is connectable to a media port of an entertainment device, the media streaming device including the apparatus.

According to another example implementation, an apparatus includes: a correlator configured to correlate a plurality of received infrared signals with a plurality of detected appliance events based on a time of each of the plurality of infrared signals and a time of each of the plurality of appliance events; and, a defining logic configured to define configuration information for a universal remote control device based on the correlating of the plurality of infrared signals with the plurality of appliance events.

According to an example implementation of the apparatus, the correlator may include: a comparator configured to compare the time of each of the plurality of infrared signals to the time of each of the plurality of appliance events; and an estimator configured to estimate a causal relationship between one or more of the plurality of infrared signals and one or more of the plurality of appliance events based on the comparing.

According to an example implementation of the apparatus, the configuration information may include a mapping between one or more of the plurality of infrared signals and one or more of the plurality of appliance events.

According to an example implementation of the apparatus, the apparatus may further include a communication interface (e.g., a network interface or other interface for communication) configured to communicate the configuration information to a universal remote control device or a universal remote control application.

According to an example implementation of the apparatus, the apparatus may include an entertainment appliance that includes the apparatus.

According to an example implementation of the apparatus, the apparatus may include a media streaming device that is connectable to a media port of an entertainment device, the media streaming device including the apparatus.

According to an example implementation, an apparatus includes means for receiving a plurality of transmitted infrared signals during a time period; means for storing the plurality of infrared signals and a time of each of the plurality of infrared signals; means for detecting a plurality of appliance events during the time period; means for storing the plurality of appliance events and a time of each of the plurality of appliance events; means for correlating the plurality of infrared signals with the plurality of appliance events based on the time of each of the plurality of infrared signals and the time of each of the plurality of appliance events; and means for defining configuration information for a universal remote control device based on the correlating of the plurality of infrared signals with the plurality of appliance events.

According to an example implementation of the apparatus, the means for correlating may include: means for comparing the time of each of the plurality of infrared signals to the time of each of the plurality of appliance events; and means for estimating a causal relationship between one or more of the plurality of infrared signals and one or more of the plurality of appliance events based on the comparing.

According to an example implementation of the apparatus, the configuration information may include a mapping between one or more of the plurality of infrared signals and one or more of the plurality of appliance events.

According to an example implementation of the apparatus, the means for storing the plurality of infrared signals may include: means for storing, in a user account provided in a network or a cloud resource, the plurality of infrared signals and the time of each of the plurality of infrared signals; and wherein the means for storing the plurality of detected appliance events may include means for storing, in the user account provided in the network or the cloud resource, the plurality of appliance events and the time of each of the plurality of appliance events.

According to an example implementation of the apparatus, the plurality of appliance events may include at least one of the following: turning an appliance on or off; increasing a volume of an appliance; decreasing a volume of an appliance; increasing a channel of an appliance; decreasing a channel of an appliance; playing media on an appliance; pausing media that is playing on an appliance; and stopping media that is being played on an appliance.

According to an example implementation of the apparatus, the means for receiving a plurality of transmitted infrared signals may include means for receiving a plurality of transmitted infrared signals that were transmitted by one or more original remote control devices to control one or more appliances.

According to an example implementation of the apparatus, the apparatus may further include means for communicating the configuration information to a universal remote control device or a universal remote control application.

According to another example implementation, an apparatus includes means for correlating a configured to correlate a plurality of received infrared signals with a plurality of detected appliance events based on a time of each of the plurality of infrared signals and a time of each of the plurality of appliance events; and, means for defining configuration information for a universal remote control device based on the correlating of the plurality of infrared signals with the plurality of appliance events.

According to an example implementation, the means for correlating may include means for comparing the time of each of the plurality of infrared signals to the time of each of the plurality of appliance events; and means for estimating a causal relationship between one or more of the plurality of infrared signals and one or more of the plurality of appliance events based on the comparing.

According to an example implementation of the apparatus, the configuration information may include a mapping between one or more of the plurality of infrared signals and one or more of the plurality of appliance events.

According to an example implementation, the apparatus may further include a communication interface (e.g., which may include a network interface) configured to communicate the configuration information to a universal remote control device or a universal remote control application.

According to an example implementation of the apparatus, the apparatus may include an entertainment appliance that includes the apparatus.

According to an example implementation of the apparatus, the apparatus may include a media streaming device that is connectable to a media port of an entertainment device, the media streaming device including the apparatus.

Figure 3:
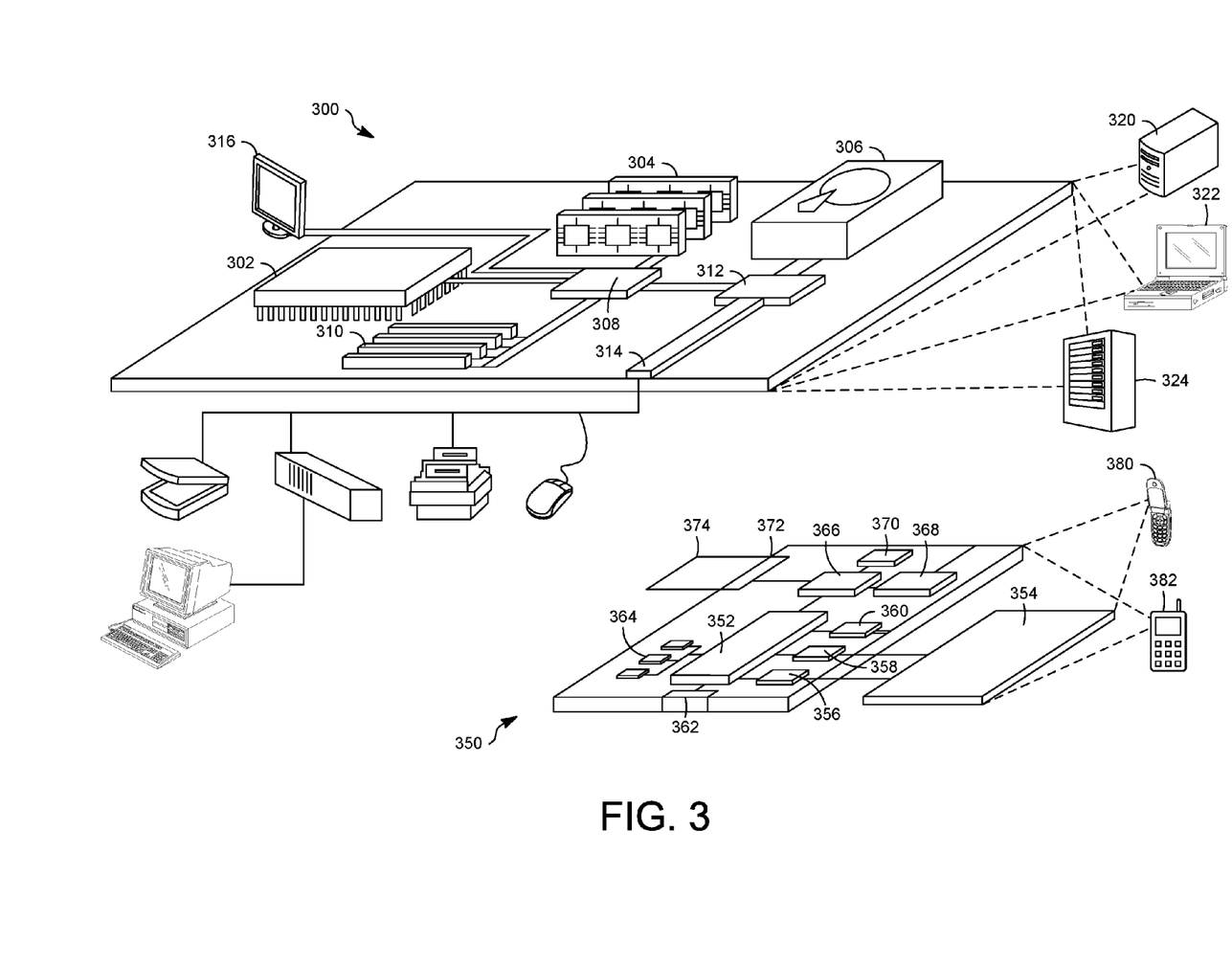
FIG. 3 shows an example of a generic computer device and a generic mobile computer device, which may be used with the techniques described here.

FIG. 3 shows an example of a generic computer device 300 and a generic mobile computer device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of configuring a universal remote control device comprising:

receiving a plurality of transmitted infrared signals from an appliance remote control for an appliance during a time period;

storing the plurality of infrared signals and a time of each of the plurality of infrared signals;

detecting a plurality of appliance events performed by the appliance in response to the plurality of infrared signals during the time period;

storing the plurality of appliance events and a time of each of the plurality of appliance events;

correlating the plurality of infrared signals with the plurality of appliance events based on the time of each of the plurality of infrared signals and the time of each of the plurality of appliance events; and defining configuration information for a universal remote control device based on the correlating of the plurality of infrared signals with the plurality of appliance events.

2. The method of claim 1 wherein the correlating comprises:

comparing the time of each of the plurality of infrared signals to the time of each of the plurality of appliance events; and estimating a causal relationship between one or more of the plurality of infrared signals and one or more of the plurality of appliance events based on the comparing.

3. The method of claim 1 wherein the configuration information comprises:

a mapping between one or more of the plurality of infrared signals and one or more of the plurality of appliance events.

4. The method of claim 1:
wherein the storing the plurality of infrared signals comprises:
storing, in a user account provided in a network or a cloud resource, the plurality of infrared signals and the time of each of the plurality of infrared signals; and
wherein the storing the plurality of detected appliance events comprises:
storing, in the user account provided in the network or the cloud resource, the plurality of appliance events and the time of each of the plurality of appliance events.

5. The method of claim 1 wherein the plurality of appliance events comprise at least one of the following:
turning an appliance on or off;
increasing a volume of an appliance;
decreasing a volume of an appliance;
increasing a channel of an appliance;
decreasing a channel of an appliance;
playing media on an appliance;
pausing media that is playing on an appliance; and
stopping media that is being played on an appliance.

6. The method of claim 1 wherein the receiving a plurality of transmitted infrared signals comprises:
receiving a plurality of transmitted infrared signals that were transmitted by one or more original remote control devices to control one or more appliances.

7. The method of claim 1 and further comprising:
communicating the configuration information to a universal remote control device or a universal remote control application.

8. An apparatus comprising:
an infrared receiver configured to receive a plurality of transmitted infrared signals from an appliance remote control for an appliance during a time period;
an appliance event detector configured to detect a plurality of appliance events performed by the appliance in response to the plurality of infrared signals during the time period;
a storage device configured to:
store the plurality of infrared signals and a time of each of the plurality of infrared signals; and
store the plurality of appliance events and a time of each of the plurality of appliance events;
a correlator configured to correlate the plurality of infrared signals with the plurality of appliance events based on the time of each of the plurality of infrared signals and the time of each of the plurality of appliance events; and
a defining logic configured to define configuration information for a universal remote control device based on the correlating of the plurality of infrared signals with the plurality of appliance events.

9. The apparatus of claim 8 wherein the correlator comprises:
a comparator configured to compare the time of each of the plurality of infrared signals to the time of each of the plurality of appliance events; and
an estimator configured to estimate a causal relationship between one or more of the plurality of infrared signals and one or more of the plurality of appliance events based on the comparing.

10. The apparatus of claim 8 wherein the configuration information comprises:
a mapping between one or more of the plurality of infrared signals and one or more of the plurality of appliance events.

11. The apparatus of claim 8 wherein the plurality of appliance events comprise at least one of the following:
turning an appliance on or off;
increasing a volume of an appliance;
decreasing a volume of an appliance;
increasing a channel of an appliance;
decreasing a channel of an appliance;
playing media on an appliance;
pausing media that is playing on an appliance; and
stopping media that is being played on an appliance.

12. The apparatus of claim 8 wherein the infrared receiver configured to receive a plurality of transmitted infrared signals comprises:
an infrared receiver configured to receive a plurality of transmitted infrared signals that were transmitted by one or more original remote control devices to control one or more appliances.

13. The apparatus of claim 8 and further comprising:
a communication interface configured to communicate the configuration information to a universal remote control device or a universal remote control application.

14. The apparatus of claim 8 wherein the apparatus comprises:
an entertainment appliance that includes the apparatus.

15. The apparatus of claim 8 wherein the apparatus comprises:
a media streaming device that is connectable to a media port of an entertainment device, the media streaming device including the apparatus.

16. An apparatus comprising:
an infrared receiver configured to receive a plurality of infrared signals transmitted by an appliance remote control for an appliance during a time period;
an appliance event detector configured to detect a plurality of appliance events performed by the appliance in response to the plurality of infrared signals during the time period;
a correlator configured to correlate a plurality of received infrared signals with a plurality of detected appliance events based on a time of each of the plurality of infrared signals and a time of each of the plurality of appliance events; and
a defining logic configured to define configuration information for a universal remote control device based on the correlating of the plurality of infrared signals with the plurality of appliance events.

17. The apparatus of claim 16 wherein the correlator comprises:
a comparator configured to compare the time of each of the plurality of infrared signals to the time of each of the plurality of appliance events; and
an estimator configured to estimate a causal relationship between one or more of the plurality of infrared signals and one or more of the plurality of appliance events based on the comparing.

18. The apparatus of claim 16 wherein the configuration information comprises:
a mapping between one or more of the plurality of infrared signals and one or more of the plurality of appliance events.

19. The apparatus of claim 16 wherein the plurality of appliance events comprise at least one of the following:

turning an appliance on or off;
increasing a volume of an appliance;
decreasing a volume of an appliance;
increasing a channel of an appliance;
decreasing a channel of an appliance;
playing media on an appliance;
pausing media that is playing on an appliance; and
stopping media that is being played on an appliance.

20. The apparatus of claim 16 and further comprising:
a communication interface configured to communicate the configuration information to a universal remote control device or a universal remote control application.

21. The apparatus of claim 16 wherein the apparatus comprises:
an entertainment appliance that includes the apparatus.

22. The apparatus of claim 16 wherein the apparatus comprises:
a media streaming device that is connectable to a media port of an entertainment device, the media streaming device including the apparatus.

* * * * *